(12) United States Patent
Maier

(10) Patent No.: US 7,388,958 B1
(45) Date of Patent: Jun. 17, 2008

(54) COMMUNICATION SYSTEM SEGREGATING COMMUNICATIONS BY SECURITY LEVEL

(75) Inventor: Timothy J. Maier, Laguna Nigel, CA (US)

(73) Assignee: Palomar Products, Inc., Rancho Santa Margarita, CA (US)

( * ) Notice: Subject to any disclaimer, the term of this patent is extended or adjusted under 35 U.S.C. 154(b) by 844 days.

(21) Appl. No.: 10/742,449

(22) Filed: Dec. 19, 2003

Related U.S. Application Data

(60) Provisional application No. 60/435,471, filed on Dec. 19, 2002, provisional application No. 60/435,475, filed on Dec. 19, 2002, provisional application No. 60/435,474, filed on Dec. 19, 2002.

(51) Int. Cl.
  *H04K 1/00* (2006.01)
(52) U.S. Cl. ....................................... 380/270
(58) Field of Classification Search ........................ None
  See application file for complete search history.

(56) References Cited

U.S. PATENT DOCUMENTS

| | | | | | |
|---|---|---|---|---|---|
| 5,920,581 | A | * | 7/1999 | Lang | 714/799 |
| 5,949,883 | A | * | 9/1999 | Ford | 380/28 |
| 2003/0221100 | A1 | * | 11/2003 | Russ et al. | 713/153 |
| 2004/0187001 | A1 | * | 9/2004 | Bousis | 713/175 |

OTHER PUBLICATIONS

Tanenbaum, Andrew "Structured Computer Organization second edition" Prentica-Hall, 1984.*

* cited by examiner

*Primary Examiner*—Gilberto Barron, Jr.
*Assistant Examiner*—Devin Almeida
(74) *Attorney, Agent, or Firm*—Rodney F. Brown

(57) ABSTRACT

A communication system is provided for distributing communications within the system while maintaining each communication at one of a plurality of different security levels. The system uses internal encryption to encode all data signals with an encryption which is specific to the security level of the particular data signal being encoded. The internal encryption is designed to segregate all data signals in the system and to maintain the segregated data signals compartmentalized while being transferred on data streams within the system via common media.

44 Claims, 8 Drawing Sheets

COMMUNICATION SYSTEM SEGREGATING COMMUNICATIONS BY SECURITY LEVEL

This is a non-provisional patent application claiming the benefit of my following three provisional patent applications all filed on Dec. 19, 2002, and all incorporated herein by reference:

Provisional Patent Application No. 60/435,471, entitled "Communication System Having a Device and Method for Segregating Multiple Communications at Different Security Levels";

Provisional Patent Application No. 60/435,475, entitled "Backup Communications Path for a Communication System"; and Provisional Patent Application No. 60/435,474, entitled "Transporting Asynchronous Signals in a Communication System".

TECHNICAL FIELD

The present invention relates generally to communication systems, and more particularly to a communication system which enables distribution of multiple communications within the system while segregating and maintaining compartmentalization of each communication at one of a plurality of different security levels.

BACKGROUND OF THE INVENTION

Data communications including audio communications often have different security levels depending on the content of the communication. Different security levels, particularly in military applications, are designated by a standardized color coding scheme. For example, black represents a relatively low security level, which applies to unclassified communications. Red represents a relatively high security level, which applies to secret (i.e., classified) communications. Pink represents an intermediate security level between unclassified communications and secret communications, which applies to commercial secure communications. Additional security levels can also be provided as needed.

To effectively distribute data communications having different security levels, communication systems are employed which segregate the data communications at different security levels from one another and maintain proper compartmentalization of the communications as they are transferred within the system. Conventional communication systems commonly provide separate communication media for each security level enabled. Thus, for example, if the communication system enables the distribution of data communications at black and red security levels, the system provides two separate communication media, one for the black security level and one for the red security level.

Each set of communication media has its own dedicated wiring and input/output ports which substantially and undesirably increase the weight, complexity, power requirements, and cost of the communication system. Conventional communication systems may also rely on trusted software for the specific functions of segregating the data communications and maintaining compartmentalization as the data communications are transferred within the communication system. Therefore, whenever the trusted software is modified, the security of the communication system must be reevaluated, which is both time-consuming and costly.

The present invention recognizes a need for a secure communication system which overcomes the above-recited drawbacks of conventional systems. Accordingly, it is generally an object of the present invention to provide a communication system which effectively maintains each data communication routed within the system at one of a plurality of preassigned security levels. More particularly, it is an object of the present invention to provide a communication system which segregates and maintains data communications at separate security levels internal to the system by a relatively simple yet effective non-classified mechanism. It is still more particularly an object of the present invention to provide a communication system which transfers data communications, regardless of their preassigned security level, within the system on common communication media. It is another object of the present invention to provide a communication system which is not primarily software based with respect to system security and, more specifically, which is hardware based with respect to the security functions of segregating data communications and maintaining compartmentalization of the data communications as they are transferred within the system. It is a further object of the present invention to provide a communication system wherein the remaining nonsystem-related functionality is primarily software based. It is still a further object of the present invention to provide a communication system, wherein the software of the system can be freely modified without necessitating reevaluation of system security.

These objects and others are accomplished in accordance with the invention described hereafter.

SUMMARY OF THE INVENTION

The present invention is a communication system which enables the distribution of data communications within the system while maintaining each communication at one of two or more different security levels. In general, the communication system uses internal encryption to encode all data signals moving within the communication system with an encryption, which is specific to the security level of the particular data signal being encoded. In accordance with a particular embodiment, internal encryption is designed to segregate all data signals in the system and to maintain the segregated data signals compartmentalized while being transferred on data streams within the system via either synchronous or asynchronous common media. Exemplary synchronous media is T1, E1 and SONET, while exemplary asynchronous media is an Ethernet LAN. Internal encryption is effected by providing separate code generators, termed encryptors, at each data source for each of the plurality of different preassigned security levels.

Each data signal is internally encrypted at a data source with an internal encryption by an encryptor before the data signal is routed from the data source via common distribution media to a data destination. Both the internal encryption and the encryptor are specific to a given security level, which corresponds to the given security level of the data signal. When the internally encrypted data signal reaches the data destination, the internally-encrypted data signal is decrypted by a decryptor which is also specific to the given security level of the data signal.

The primary purpose of the internal encryption is to segregate and maintain compartmentalization of data signals at different security levels during internal transfer of the data signals through the common distribution media of the communication system rather than to secure the communications when disclosed to or appropriated by unintended recipients external to the communication system. As such, internal encryption can advantageously be performed at a very low level of the system and can be designed into a communication system with a minimal effect on the existing hardware and software of the system. Furthermore, the internal encryption does not interfere with any external encryption, such as external COMSEC encryption, which has the aforesaid purpose of securing communications from unintended recipients external to the communication system. Therefore, internal encryption can coexist with external encryption on the same data signals.

In accordance with another particular embodiment of the present invention, an error detection mechanism is provided to detect decryption errors. An exemplary mechanism for detecting decryption errors is the inclusion of an error detection marker, such as one or more parity bits, with the data bits in the data signal at the data source. The data signal including both the data bits and the error detection marker is encrypted at the data source. When the data signal reaches the data destination, the data signal is decrypted and the error detection marker is checked. If the error rate exceeds a threshold value, the data signal is blocked to prevent the data destination from receiving incorrectly decrypted data. This feature correspondingly prevents a user of the system from receiving incorrectly decrypted audio which sounds like white noise. Error detection also prevents incorrectly decrypted data from ever leaving the communication system to another external communication system. Therefore, the codes used to segregate and compartmentalize the data internally do not have to endure cryptographic analysis.

Since all security levels may converge at data sources and destinations, each data source and destination must have the capability to send and receive data at a plurality of different security levels. Data received at the data destination is evaluated using a set of interlock rules based on the transmit level of the data destination and a press to talk switch state. In general, receive data at a higher security level is blocked when actively transmitting at a lower security level. This prevents coupling of received high security data to a low security transmit path. The capability to ensure that a data signal at a given security level is properly segregated and remains properly and consistently compartmentalized is hardware based. However, system functionality, which is predominately software based, can be freely modified without requiring the reevaluation of system security, which is inherent to the hardware.

A number of advantageous features are realized by the communication system of the present invention. As noted above, the primary function of the internal encryption in the system is to compartmentalize the internal data signals moving on common media so that the separate internal data signals can be distinguished from one another at the data destinations. However, internal encryption also functions to enhance the security of the internal data signals. The internal encryption provides an added level of security in the event internal data signals are intercepted by an unintended recipient external to the system. If the error detector, i.e., parity checker, fails and internal data signals are erroneously misrouted out of the communication system, the data signals would remain internally encrypted or even doubly encrypted (e.g., encrypted by black code and decrypted by red code). Accordingly, if the error detector fails and an internal data signal in the nature of a conversation is erroneously misrouted out of the system, the conversation would be interrupted due to the encrypted voice in at least one direction. This result limits the potential loss of secure data from the system and provides users with an indication of a problem when error detection fails.

Another advantageous feature of the present invention is that internal encryption lowers the spectrum of the signal. An unintended recipient could theoretically access a weakly encrypted internal data signal through electromagnetic emanations. However, the internal encryption process distributes the signal energy more evenly across the spectrum making the internal data signal closer to the noise floor and more difficult to detect when being eavesdropped on.

Yet another advantageous feature is the synchronous media employed by the present system. Synchronous media has a fixed latency which does not vary significantly between any two data sources and destinations in a confined communication system. This feature is advantageous because, the greater the latency variation that a data sink, i.e., decryptor, must tolerate, the more decryption hardware is needed to accommodate the resulting delay. In any given frame, the data sink must be able to decode the data from any data source regardless of the delay. Thus, the data sink must undesirably maintain proper decrypting data for each delay attributable to latency variations.

Still another advantageous feature is that the internal encryption for segregating internal data signals in the system at given security levels and maintaining the segregated internal data signals compartmentalized while being transferred within the system does not rely on any classified or secret techniques. Nor does internal encryption rely on any classified or secret algorithms. Accordingly, the present invention is adaptable to a wide range of civilian applications as well as military applications without requiring any security clearances to implement.

The present invention will be further understood from the drawings and the following detailed description.

DESCRIPTION OF PREFERRED EMBODIMENTS

The present invention is a communication system and a method of using the same. In accordance with a preferred embodiment, the communication system is a confined communication system. A "confined communication system" is defined herein as a system having a plurality of different system source and destination components, which are restricted to a relatively confined space. Examples of a "confined space" include an onboard aircraft environment, an onboard ship environment, or an areally-restricted land-based environment. A number of additional terms are used herein which have definitions specific to the present invention. The term "data" is inclusive of audio data, such as voice or voice data, and non-audio data, such as video data and computer files. Communications moving within the communication system may be alternately termed "signals", "data signals", "communication signals", "data communications", "communications", "streams", "data streams", and the like. Such terms may be used interchangeably unless stated otherwise herein.

Figure 1:
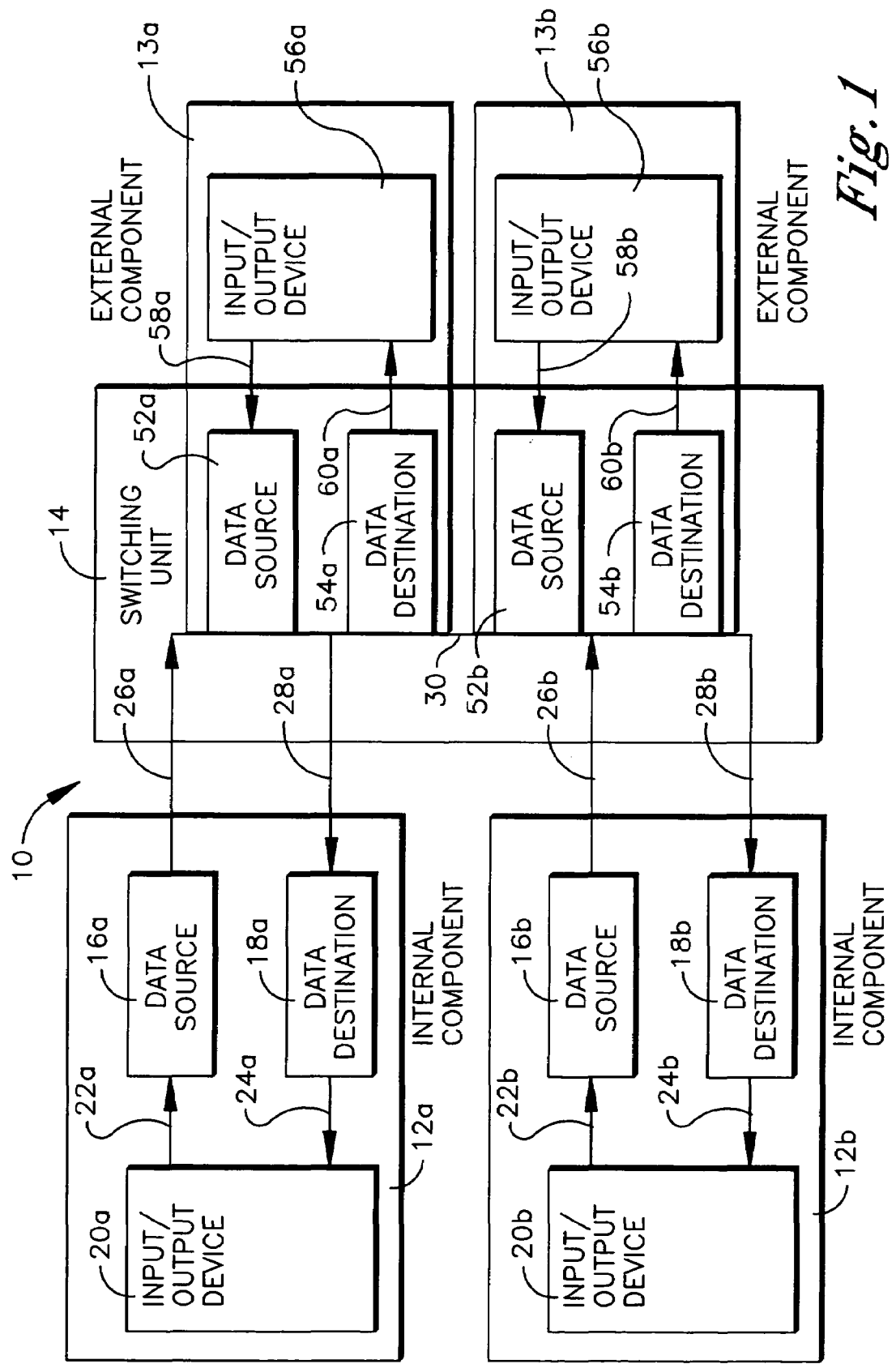
FIG. 1 is a schematic block diagram of a generalized communication system of the present invention.

Referring to FIG. 1, a generalized communication system is shown and designated 10. The communication system 10 comprises a first system source and destination component 12a, a second system source and destination component 12b, a third system source and destination component 13a, a fourth system source and destination component 13b source, and a switching unit 14. The following description is initially directed to only the first and second system source and destination components 12a, 12b. The third and fourth system source and destination components 13a, 13b are described thereafter.

The first system source and destination component 12a comprises a first data source 16a, a first data destination 18a, and a first input/output device 20a. The first input/output device 20a and the first data source 16a are in communication with one another via a first input/output source line 22a, while the first input/output device 20a and the first data destination 18a are in communication with one another via a first input/output destination line 24a. The first data source 16a and switching unit 14 are in communication with one another via a first source common data medium 26a and the first data destination 18a and switching unit 14 are in communication with one another via a first destination common data medium 28a.

Communication between the switching unit 14 and the first data source 16a is specifically enabled by coupling the first source common data medium 26a with a switching common data medium 30 internal to the switching unit 14. Similarly, communication between the switching unit 14 and the first data destination 18a is enabled by coupling the first destination common data medium 28a with the switching common data medium 30. The switching common data medium 30 functions as common transfer medium for all data signals moving internally within the switching unit 14 regardless of the source of the data signals.

The second system source and destination component 12b comprises a second data source 16b, a second data destination 18b, and a second input/output device 20b. The second input/output device 20b and the second data source 16b are in communication with one another via a second input/output source line 22b, while the second input/output device 20b and the second data destination 18b are in communication with one another via a second input/output destination line 24b. The second data source 16b and switching unit 14 are in communication with one another via a second source common data medium 26b and the second data destination 18b and switching unit 14 are in communication with one another via a second destination common data medium 28b.

Communication between the switching unit 14 and the second data source 16b is specifically enabled by coupling the second source common data medium 26b with the switching common data medium 30. Similarly, communication between the switching unit 14 and the second internal data destination 18b is enabled by coupling the second internal destination common data medium 28b with the switching common data medium 30.

Figure 2:
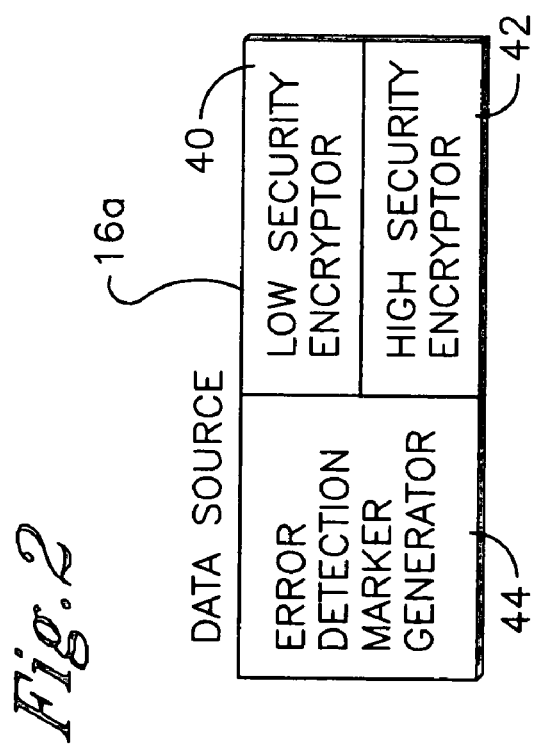
FIG. 2 is a schematic block diagram of a data source employed in the communication system of FIG. 1.

Referring to FIG. 2, the first data source 16a comprises a low security encryptor 40 for generating low security internal data signals, a high security encryptor 42 for generating high security internal data signals, and an error detection marker generator 44 for generating error detection markers to accompany the low and high security internal data signals. The second data source 16b is essentially identical to the first data source 16a, likewise comprising a low security encryptor 40, high security encryptor 42, and error detection marker generator 44. The terms "low" and "high" are used in a relative manner herein and do not denote specific security levels. Each data source is capable of generating internal data signals and transmitting the internal data signals to a data destination of a different system source and destination component. Internal data signals are defined herein as data signals, which are internally encrypted (i.e., encrypted by means internal to the communication system 10) and move exclusively via media internal to the communication system 10.

Figure 3:
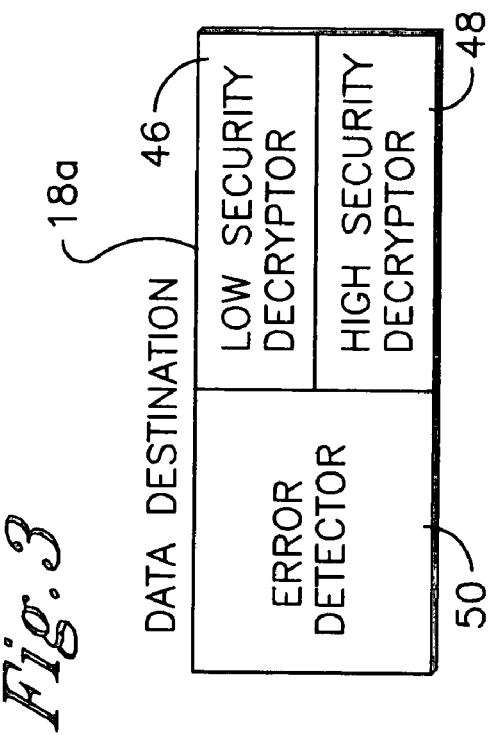
FIG. 3 is a schematic block diagram of a data destination employed in the communication system of FIG. 1.

Referring to FIG. 3, the first data destination 18a comprises a low security decryptor 46 for deciphering low security internal data signals, a high security decryptor 48 for deciphering high security internal data signals, and an error detector 50 for checking the error detection markers accompanying the low and high security internal data signals and blocking erroneous data signals. The second data destination 18b is essentially identical to the first data destination 18a, likewise comprising a low security decryptor 46, high security decryptor 48, and error detection marker generator 50. Each data destination is capable of receiving internal data signals from a data source of a different system source and destination component and deciphering the internal data signals.

The data sources 16a, 16b and data destinations 18a, 18b are shown conceptually in FIG. 1 as separate elements for purposes of illustration. However, any pair of corresponding data sources and data destinations 16a, 18a or 16b, 18b can alternatively be combined in a single integrated element. The integrated data source/destination has the dual capability of generating and transmitting internal data signals as well as receiving and deciphering internal data signals. Unless stated otherwise, no distinction is made herein between data sources and data destinations which are physically separate and data sources and data destinations which are physically combined in an integrated data source/destination.

The integrated data source/destination includes the low and high security encryptors 40, 42 as well as the low and high security decryptors 46, 48. An encryptor and a decryptor are commonly termed in combination an en/de-cryptor. The terms "en/de-cryptor" and "encryptor and decryptor" may be used synonymously herein to refer to either separate devices, which perform an encryption function and a decryption function, respectively, or to a single integrated device, which performs both an encryption function and a decryption function. The present encryptors and decryptors 40, 42, 46, 48 are all characterized as being hardware devices, i.e., the encryption and decryption functions of the devices are hardware dependent rather than software dependent. When multiple encryptors are present in an integrated data source/destination, data from an input/output device is only allowed to use either the high or the low security encryptor at any given time. This feature is enabled by a hardware interlock and is described hereafter.

Although each system source and destination component 12a, 12b is operable with a single input/output device 20a, 20b as shown in FIG. 1, it is within the scope of the present invention to include two or more input/output devices within a single system source and destination component 12a or 12b. Use of a plurality of input/output devices is particularly common in an internal system source and destination component, which is described below.

In an alternate embodiment of the present invention not shown in FIG. 1, the data source 16a, 16b and/or data destination 18a, 18b of any system source and destination component 12a, 12b can be incorporated internally into the switching unit 14 while the input/output device remains 20a, 20b external to the switching unit 14. In accordance with this embodiment, the data source 16a, 16b and/or data destination 18a, 18b interface directly with the switching unit 14, eliminating the source common data medium 26a, 26b and/or the destination common data medium 28a, 28b. Accordingly, the data source 16a, 16b and/or data destination 18a, 18b communicate directly with the switching common data medium 30 internal to the switching unit 14 without any intervening data links. In a preferred embodiment the data source and data destination of every external system source and destination component, which is described below, are incorporated internally into the switching unit 14 and communicate directly with the switching common data medium 30 internal to the switching unit 14.

The method of the present invention generally comprises generating a plurality of internal data signals having different levels of security from input signals and placing the internal data signals on data streams at each data source 16a or 16b while segregating the internal data signals from one another on the data streams in accordance with their respective security level. The internal data signals are internally communicated from the data sources 16a, 16b to data destinations 18a, 18b within the communication system 10, while maintaining compartmentalization of the internal data signals on the data streams according to their respective security level until the internal data signals reach their respective data destination 18a or 18b.

The method can be initiated by providing a first input signal at the first input/output device 20a of the first system source and destination component 12a. The first input signal has a preassigned low security level and a preassigned specific data destination. A second input signal is also provided at the first input/output device 20a. The second input signal is separate from the first input signal and has a preassigned high security level and a preassigned specific data destination.

The first and second input signals are each either an internally-originating data signal or an externally-originating data signal. An internally-originating data signal is a data signal, which is free from external encryption and which originates at an internal system source and destination component. An exemplary internally-originating data signal is an audio data signal from an internal user microphone and/or headphone. An externally-originating data signal is a data signal, which may or may not have external encryption and which enters the communication system 10 via an external system source and destination component. An exemplary externally-originating data signal is an audio data signal transmitted by a radio of a communication system external to the communication system 10 and received by a radio of an external system source and destination component.

The first and second input signals are directed as separate signals from the first input/output device 20a to the first data source 16a via the first input/output source line 22a. A first low security internal data signal is generated at the first data source 16a from the first input signal and a first high security internal data signal is generated at the first data source 16a from a second input signal. In particular, the first input signal is directed to the low security encryptor 40 of the first data source 16a in response to a routing command and the low security encryptor 40 generates the first low security internal data signal by internally encrypting the first input signal. The second input signal is correspondingly directed to the high security encryptor 42 of the first data source 16a in response to a routing command and the high security encryptor 42 generates the first high security internal data signal by internally encrypting the second input signal. As noted above, if a data source and destination supports both high and low level security encryptors, only the low or high security path is used at any one time based on the hardware interlock described hereafter.

The first data source 16a sequentially places the first low and high security internal data signals on a first source data stream and places the first source data stream onto the first source common data medium 26a, over which the first source data stream moves to the switching unit 14. Segregation of the first low security internal data signal from the first high security internal data signal on the first source data stream is facilitated in part by distinctions between the low and high internal encryptions of the two data signals, which enable differentiation of the two data signals on the first source common data medium 26a.

The method further comprises providing third and fourth separate input signals. In particular, the third input signal is provided at the second input/output device 20b of the second system source and destination component 12b. The third input signal has a preassigned low security level and a preassigned specific data destination. The fourth input signal is also provided at the second input/output device 20b. The fourth input signal has a preassigned high security level and a preassigned specific data destination.

The third and fourth input signals are directed from the second input/output device 20b to the second data source 16b via the second input/output source line 22b. A second low security internal data signal is generated at the second data source 16b from the third input signal and a second high security internal data signal is generated at the second data source 16b from a fourth input signal in substantially the same manner as the first data source 16a. The second data source 16b sequentially places the second low and high security internal data signals on a second source data stream and places the second source data stream onto the second source common data medium 26b, over which the second source data stream moves to the switching unit 14. Segregation of the second low security internal data signal from the second high security internal data signal on the second source data stream is facilitated in part by distinctions between the low and high internal encryptions of the two data signals, which enable differentiation of the two data signals on the second source common data medium 26b.

The switching unit 14 receives the first source data stream from the first data source 16a via the first source common data medium 26a and the second source data stream from the second data source 16b via the second source common data medium 26b and places the internal data signals onto the switching common data medium 30. The switching unit 14 then directs each low or high security internal data signal from the switching common data medium 30 to the first or second data destination 18a or 18b in response to a software-controlled routing command derived from the preassigned data destination. In particular, the switching unit 14 routes each low or high security internal data signal, if any, directed to the first data destination 18a on a first destination data stream and places the first destination data stream onto the first destination common data medium 28a, over which the first destination data stream moves to the first data destination 18a. The switching unit 14 similarly places each low or high security internal data signal, if any, directed to the second data destination 18b on a second destination data stream and places the second destination data stream onto the second destination common data medium 28b, over which the second destination data stream moves to the second data destination 18b.

The first or second low security internal data signals, if any, on the first destination data stream from the first destination common data medium 28a are separately directed to the low security decryptor 46 of the first data destination 18a where the first or second low security internal data signals, if any, are deciphered, i.e., internally decrypted, to unencrypted first or third low security output signals, respectively, which correspond to the first or third low security input signals. The first or second high security internal data signals, if any, on the first destination data stream from the first destination common data medium 28a are separately directed to the high security decryptor 48 of the first data destination 18a where the first or second high security internal data signals, if any, are deciphered, i.e., internally decrypted, to unencrypted second or fourth high security output signals, respectively, which correspond to the second or fourth high security input signals.

To confirm that the first and second low and high security internal data signals have been routed to the respective proper low and high security decryptors 46, 48 of the first data destination 18a and/or that the first and second low and high security internal data signals have been properly decrypted, the error detector 50 of the first data destination 20 performs a check on the error detection marker of the output signals. The first or third low security output signals, if any, and second or fourth high security output signals, if any, are directed from the first data destination 18a to the first input/device 20a via the first input/output destination line 24a.

The first or second low security internal data signals, if any, on the second destination data stream from the second destination common data medium 28b are similarly separately directed to the low security decryptor 46 of the second data destination 18b where the first or second low security internal data signals, if any, are deciphered, i.e., internally decrypted, to unencrypted first or third low security output signals, respectively, which correspond to the first or third low security input signals. The first or second high security internal data signals, if any, on the second destination data stream from the second destination common data medium 18b are separately directed to the high security decryptor 48 of the second data destination 18b where the first or second high security internal data signals, if any, are deciphered, i.e., internally decrypted, to unencrypted second or fourth high security output signals, respectively, which correspond to the first or third security input signals.

To confirm that the first and second low and high security internal data signals have been routed to the respective proper low and high security decryptors 46, 48 of the second data destination 18b and/or that the first and second low and high security internal data signals have been properly decrypted, the error detector 50 of the second data destination 18b performs a check on the error detection marker of the output signals. The first or third low security output signals, if any, and second or fourth high security output signals, if any, are directed from the second data destination 18b to the second input/device 20b via the second input/output destination line 24b.

A preferred embodiment of the invention is described below with continuing reference to FIGS. 1-3, wherein the communication system 10 is a confined communication system and more particularly is an aircraft audio communication system, which is internal to an aircraft (not shown). However, it is understood that this specific embodiment is presented for the purpose of more clearly illustrating the above-recited invention rather than for the purpose of limiting the invention.

In accordance with the present embodiment, the first and second system source and destination components 12a, 12b are designated as internal system source and destination components and the third and fourth system source and destination components 13a, 13b are designated as external system source and destination components. The third and fourth system source and destination components 13a, 13b are comprised of the same general elements as the first and second system source and destination components 12a, 12b described above. As such, the third and fourth system source and destination components 13a, 13b each have a data source 52a, 52b and a data destination 54a, 54b, which are essentially the same as the data sources 16a, 16b and data destinations 18a, 18b described above. The third and fourth system source and destination components 13a, 13b likewise each have an input/output device 56a, 56b. The input/output devices 56a, 56b and the data sources 52a, 52b are in communication with one another via input/output source lines 58a, 58b, respectively, while the input/output devices 56a, 56b and the data destinations 54a, 54b are in communication with one another via input/output destination lines 60a, 60b, respectively.

As is apparent from FIG. 1, an attribute of all external system source and destination components is that the data sources 52a, 52b and data destinations 54a, 54b are incorporated internally into the switching unit 14 while the input/output devices 56a, 56b remain external to the switching unit 14. The data sources 52a, 52b and data destinations 54a, 54b of the external system source and destination components 13a, 13b interface directly with the switching unit 14, eliminating the source common data media and the destination common data media. Accordingly, the data sources 52a, 52b and data destinations 54a, 54b communicate directly with the switching common data medium 30 internal to the switching unit 14 without any intervening data links.

Further differences exist between internal and external system source and destination components as recited in the definitions set forth below. An internal system source and destination component has the reception capability of receiving signals from another internal or external system source and destination component within the communication system 10. The received signal travels in sequence from another internal or external input/output device, to another data source, to the switching unit, to the associated data destination, and finally to the associated internal input/output device. Similarly an internal system source and destination component only has the transmission capability of transmitting signals to another internal or external system source and destination component within the communication system 10. The transmitted signal travels in sequence from the associated internal input/output device, to the associated data source, to the switching unit, to another data destination, and finally to another internal or external input/output device.

An external system source and destination component has the reception and transmission capabilities of receiving and transmitting signals between the external system source and destination component and an internal system source and destination component in the same manner described above. An external system source and destination component also has the capability of receiving or transmitting signals between the associated external input/output device and another external input/output device of another external system source and destination component within the communication system 10. Unlike signals transmitted to an internal system source and destination component, however, signals transmitted from one external system source and destination component to another may be routed directly from one to the other through the switching unit without routing the signals through any data sources or data destinations. An external system source and destination component similarly has the capability of receiving or transmitting signals via an associated external input/output device, the switching unit and another input/output device of a communication system external to the communication system 10 without routing the signals through any data sources or data destinations.

An exemplary external input/output device is an external radio, such as a conventional transceiver, which can transmit internally-originating data signals to other communication systems (not shown) external to the communication system 10. An external radio can also receive data signals from other communication systems for subsequent delivery to the communication system 10. Another exemplary external input/output device is an external crypto, such as a conventional encryptor and decryptor in combination, which can apply external encryption to internally-originating data signals before transmission to other communication systems. The external crypto can also decipher the external decryption of externally-originating data signals received from other communication systems before entering the communication system 10. Examples of internal input/output devices include audio panels, headsets, cordsets, handsets, microphones, jackboxes, speakers and footswitches. It is noted that the present invention is not limited by any specific compilation or configuration of internal or external input/output devices.

Although the present invention is enabled by the single switching unit 14 as shown, it is within the scope of the present invention to include one or more additional switching units within the system 10. Multiple switching units can be linked to emulate a single large switching unit if desired. The use of multiple switching units also provides stereophonic sound capability and fault tolerance for mission critical communications and facilitates expansion of the system 10 for the inclusion of additional system source and destination components, if desired.

The switching unit 14 comprises a plurality of elements including multiple switches and relays. The switching unit 14 provides switching and mixing of digitized voice signals by means of digital time division multiplexed (TDM)-based non-blocking data switching, which allows crew members positioned at different internal system source and destination components to communicate among each other. The switching unit 14 also provides switching of data signals having external encryption between external radios and cryptos, which allows crew members positioned at internal system source and destination components to communicate with others external to the system 10 via the external system source and destination components. An exemplary method of switching data signals between radios and cryptos is disclosed in my copending patent application entitled "Transferring Asynchronous Signals Within a Synchronous Communication System", which is incorporated herein by reference. The switching unit 14 may further provide switching of data signals to a backup communications path as disclosed in my copending patent application entitled "Backup Circuitry for a Communication System", which is incorporated herein by reference.

Each internal system source and destination component 12a, 12b has a source/destination common data medium termed a T1 link, which corresponds to the source and destination common data media 26, 28. Each T1 link transports internal data signals, such as digitized audio and display data, and control signals between a system source and destination component 12 and the switching unit 14. An exemplary T1 link is a 1.544 Mbps data link. Each T1 link comprises two dedicated communication links, the source common data medium 26 and the destination common data medium 28. The T1 link has two wire-pairs, one wire-pair is the source common data medium 26 for transmit and the other wire-pair is the destination common data medium 28 for receive.

Although the present invention is operable with a single T1 link for each internal system source and destination component 12 as shown, it is within the scope of the present invention to include one additional T1 link for each internal system source and destination component 12. A single T1 link per internal system source and destination component provides monaural or stereo feed to the system source and destination component 12, but has no fault tolerance. Two dedicated T1 links per internal system source and destination component provide fault tolerance. Additional T1 links can also be used to connect multiple switching units together into larger switching units.

The T1 links described herein are one example of a synchronous communication link. However, it is understood that any of the communication media recited herein can alternatively be replaced with other media capable of supporting synchronous communications, such as E1, SONET, FDDI-II, or ATM.

The switching unit 14 interfaces with the internal and external system source and destination components 12, 13 by means of a plurality of cards retained in the switching unit 14. Each card is specific for handling the particular interface requirements of a given system source and destination component. Thus, for example, one card type is used for interfacing with the analog interfaces of the external radio and external crypto. Another card type is used for interfacing with the T1 links.

All cards of the switching unit 14 generally comprise two parts, a processor part and an input/output part. For example, the T1 card, which provides an interface between the switching unit 14 and the T1 links, has two hardware parts, a processor part and a T1 input/output part. The T1 input/output part typically has a plurality of T1 interfaces per card, e.g., four T1 interfaces per card. Each T1 interface comprises two transformer-coupled twisted pairs, one pair for transmit and one pair for receive. All internal data signals enter the system 10 through the internal or external system source and destination components 12. Each T1 interface connects with an internal system source and destination component 12 via a T1 link enabling the transport of internal data signals between the internal system source and destination component and the switching unit 14.

The T1 card acts as a hardware router which operates under process control software to route internal data signals, such as internally-encrypted audio signals, and control signals, such as process control messages, from the T1 links, which are coupled with the internal system source and destination components 12, to internal TDM buses of the switching unit 14 and vice versa. More particularly, the T1 input/output part transparently routes internal data signals between the internal TDM buses of the switching unit 14 and the proper T1 port and channel on the T1 card. It is noted that the switching common data medium 30 shown in FIG. 1 is comprised of the internal TDM buses of the switching unit 14.

Internally-encrypted audio signals on the T1 links or internal TDM buses are preferably composed of encrypted audio (Nx8 bits per frame) and parity (Nx1 bit also encrypted). The "Nx" nomenclature means that an audio channel can occupy more than one T1 link channel or TDM bus channel. The T1 card does not have the ability to encrypt or decrypt the internal data signals, which is performed at the internal system source and destination components 12.

Figure 4:
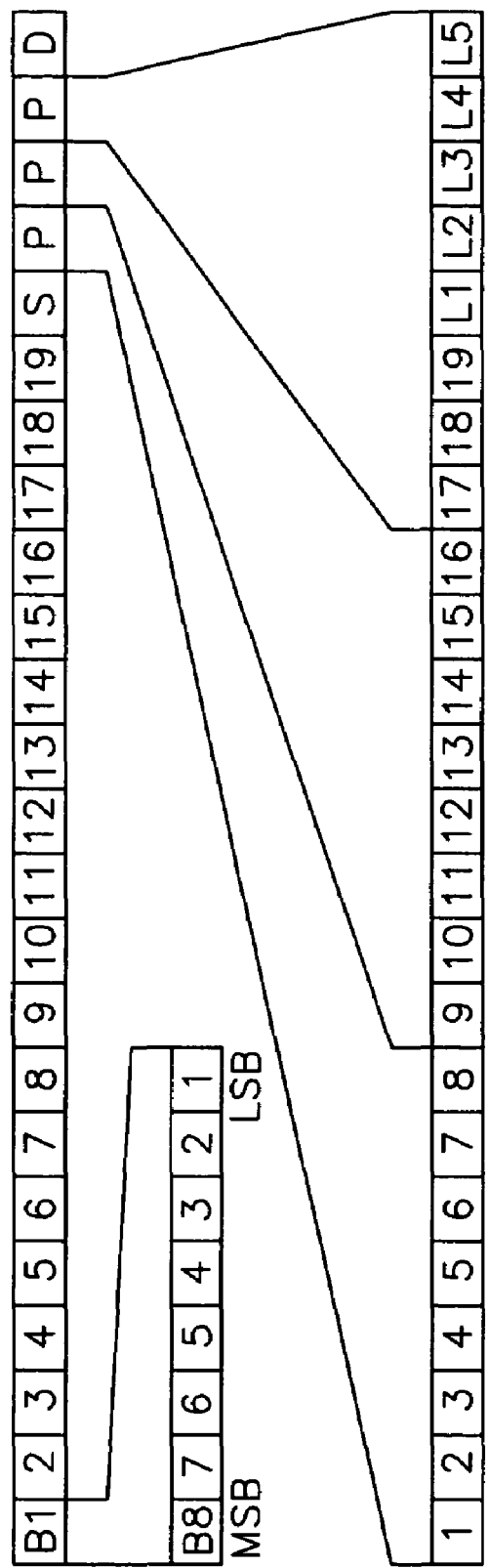
FIG. 4 is a schematic diagram of a multiplexed parity bit to be placed on a data stream in accordance with a method of the present invention.

One embodiment of the channels of a T1 data stream which is traveling in either the transmit (Tx) or receive (Rx) direction is shown and described with reference to FIG. 4. The T1 data stream includes multiplexed encrypted parity bits in addition to the encrypted internal data signals. Each T1 frame comprises 24 8-bit channels. Three channels (21-23) are used to carry parity bits (P), which function as error detection markers, between the internal system source and destination components 12 and the switching unit 14. Parity bit 1 is the parity bit for B channel 1, parity bit 2 is the parity bit for B channel 2, and so on. One additional channel (20) is used to carry a code synchronization signal (S) and one channel (24) is used as a data (D) channel which supports process control communications between the system source and destination components 12 or between the switching unit 14 and a system source and destination component 12. Thus, the T1 card can carry 19 encrypted channels (1-19), which are the internal data signals.

All cards of the switching unit 14 are either classified as data routers or data sources and/or data sinks. Data sinks are alternately termed data destinations. Data routers provide means for transferring internal data signals within the system 10, but lack the ability to internally encrypt or decrypt data signals. The T1 cards described above are data routers. All other switch cards are either data sources and/or data destinations. In general, each card, which is a data source, only has the hardware ability to encrypt one security level, while each card which is a data destination only has the hardware ability to decrypt one security level. If a card is both a data source and a data destination, the source/destination card is at the same security level. However, in some instances a source/destination card may have the ability to decrypt multiple security levels. For example, it is desirable to record both red and black internal data signals with a single recorder. The recorder interface receives both red and black, but the black becomes red because the interface can only encrypt red. Therefore, when data at two security levels (black and red) is decrypted, the data at the lower security level (black) assumes the higher security level (red).

Figure 5:
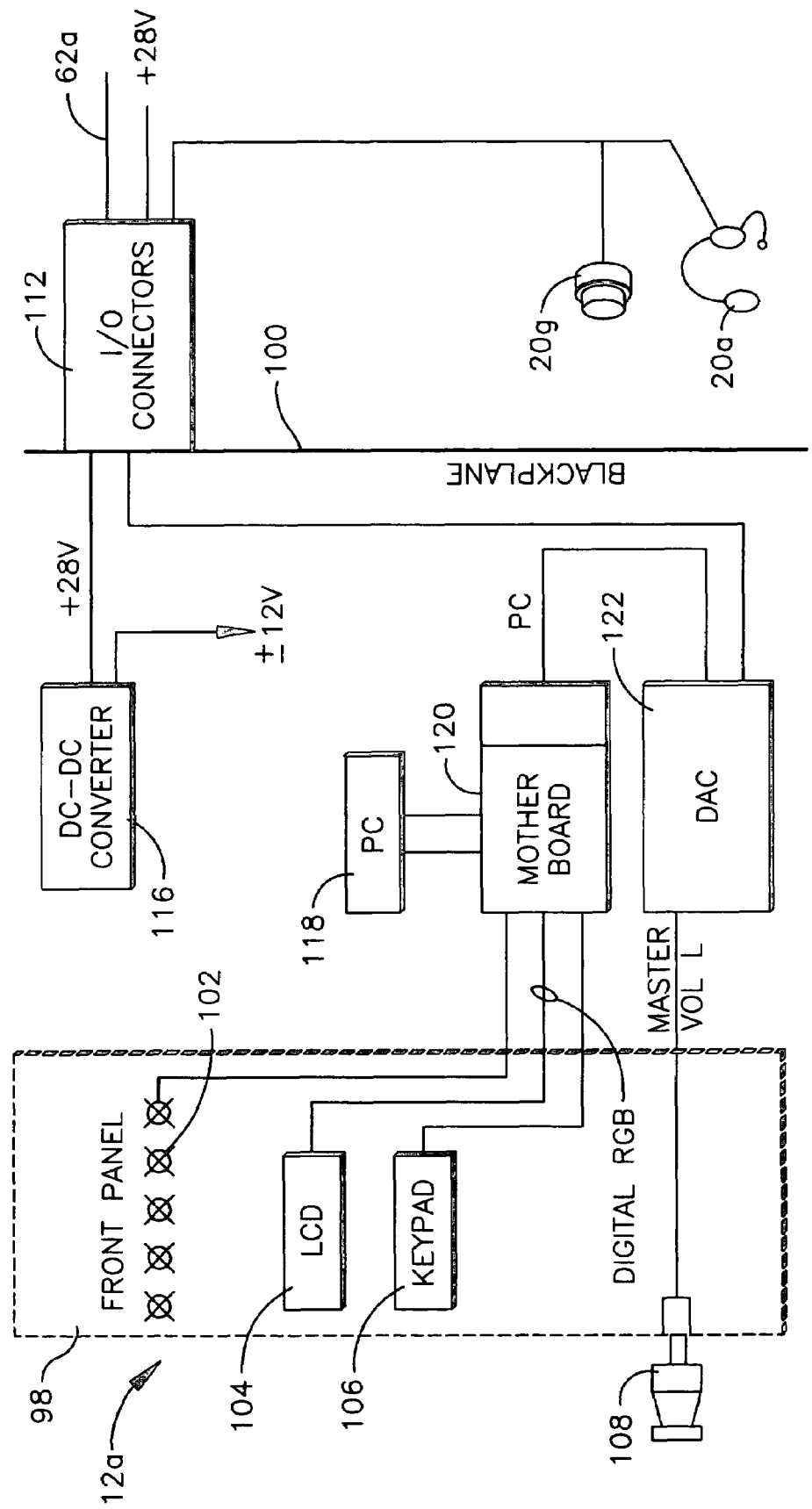
FIG. 5 is a schematic block diagram of a system source and destination component employed in the communication system of FIG. 1.
Figure 6A:
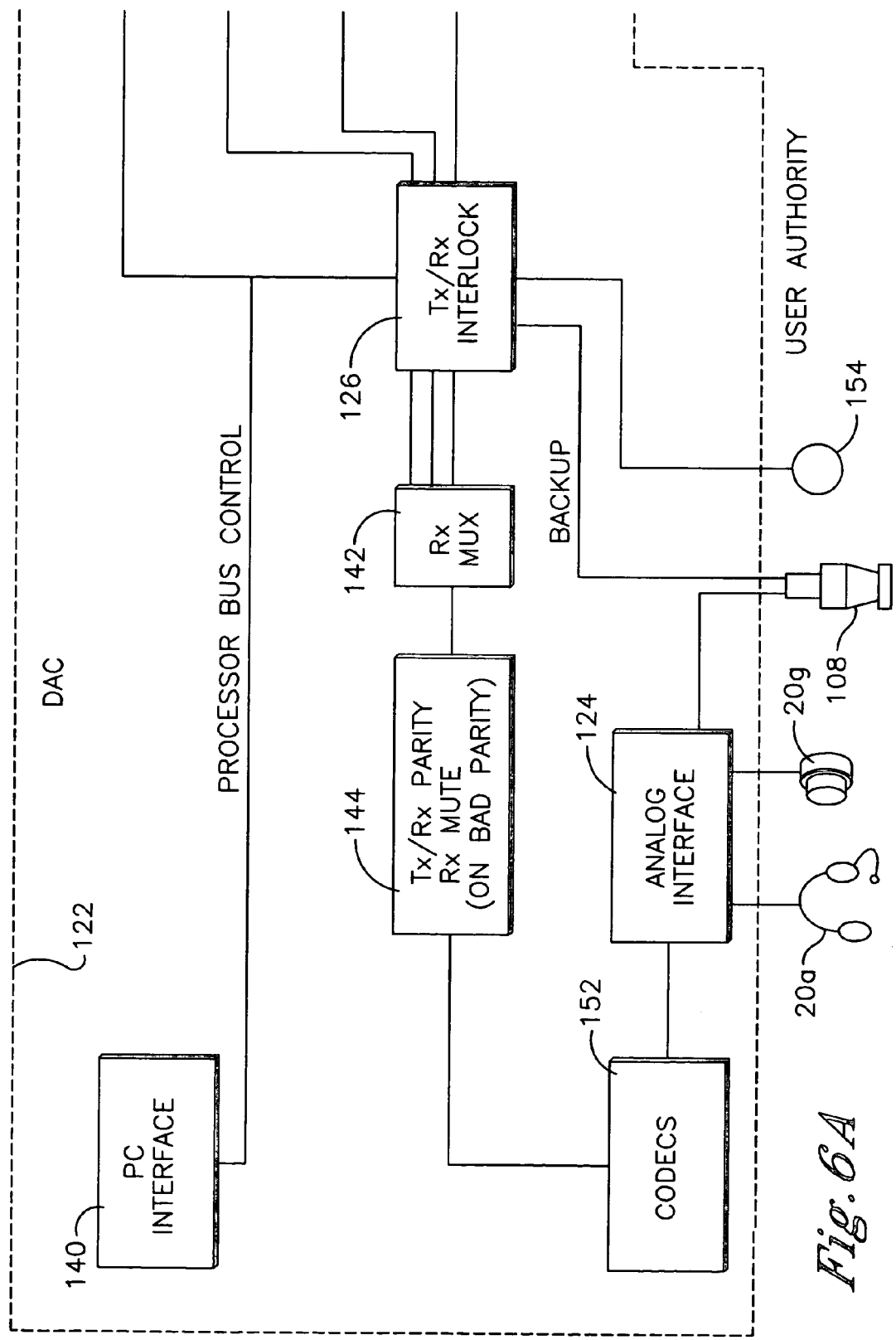
FIGS. 6A and 6B are a schematic block diagram of a digital audio card employed in the system source and destination component of FIG. 5.
Figure 6B:
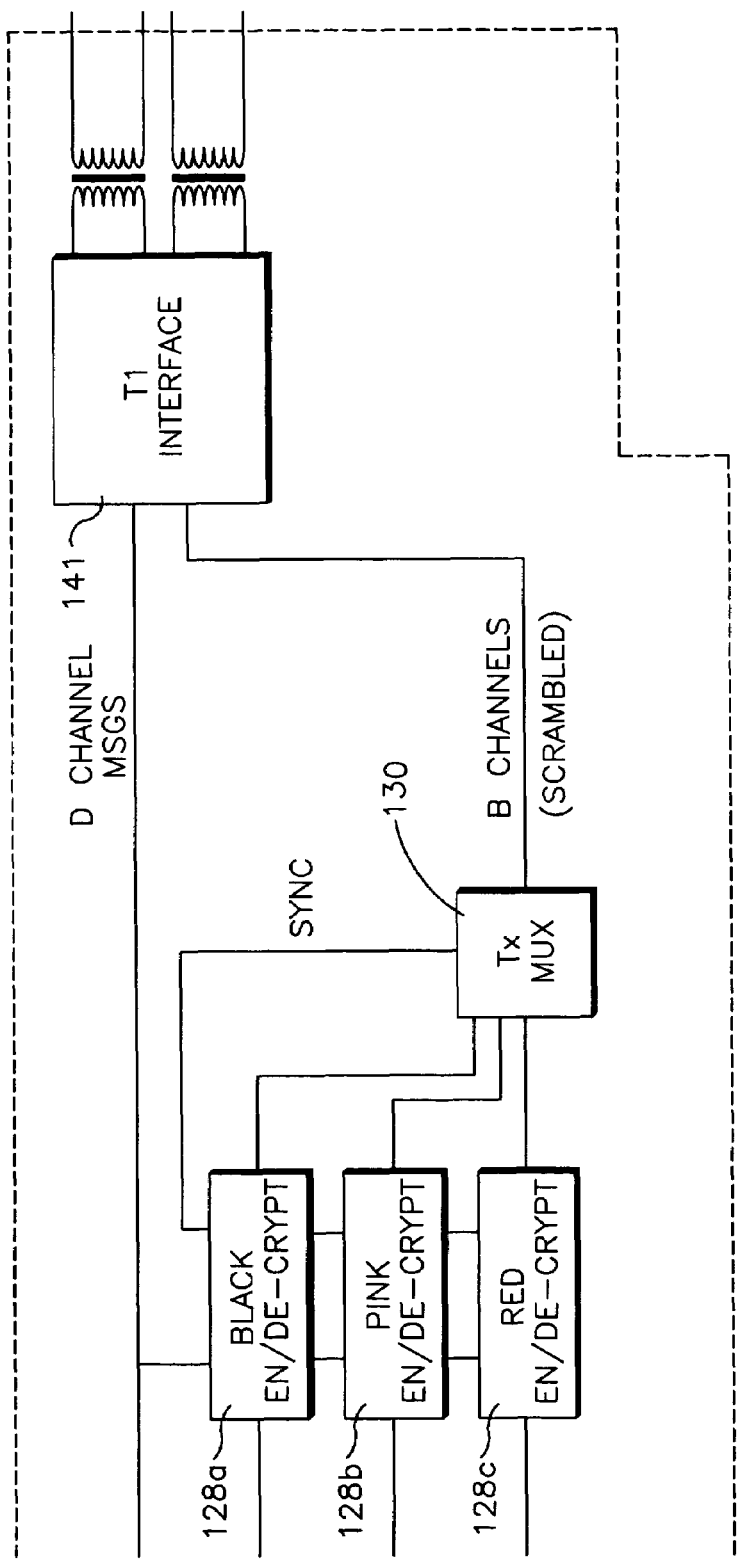

Details of a representative internal system source and destination component 12a having utility in the confined onboard aircraft audio communication system 10 are shown and described hereafter with reference to FIGS. 5, 6A and 6B. Referring initially to FIG. 5, the system source and destination component 12a has a front panel 98 and a backplane 100. The front panel 98 is an operator input/output panel, which includes a plurality of indicator lights 102, a liquid crystal display 104 (designated "LCD" in FIG. 5), a keypad 106, and an operator volume control 108. The backplane 100 has input/output connectors 112 (designated "I/O CONNECTORS" in FIG. 5), which connect to the T1 link associated with the system source and destination component 12a and to a plurality of internal input/output devices included within the system source and destination component 12a, namely a headset 20a and headset press to talk switch (PTT) 20g. The front panel 98 and backplane 100 house a plurality of internal elements including a DC-DC converter 116, a process controller 118 (designated "PC" in FIG. 5), a motherboard 120, and a digital audio card 122 (designated "DAC" in FIG. 5). The PC 118 employs a conventional CPU to provide the process control function.

The DAC 122 is both a data source and a data destination for internal data signals at all available security levels. The DAC 122 separately generates internal data signals from input signals in accordance with their specified security levels and compartmentalizes the internal data signals at their respective security levels on common media for routing to any other data destination in the system 10. The DAC 122 also receives a plurality of internal data signals, which are compartmentalized at their respective security levels on common media, from any other data source in the system 10 and separately decrypts the internal data signals in accordance with their security levels to produce output signals corresponding to the input signals. The DAC 122 is normally the only location in the confined onboard aircraft communication system 10 where data of all security levels converge in a non-obfuscated, i.e., unencrypted, form.

In accordance with the present specific embodiment, the DAC 122 provides a T1 interface to exchange data communications with a digital switch in the switching unit 14. In the case where the data communications are audio, the DAC 122 provides audio to both ears of a crew member for a monaural feed or to one ear of a crew member for a binaural feed. In an alternate embodiment not shown, a second DAC identical to the DAC 122 is included in the system source and destination component 12a to provide stereophonic sound capability and fault tolerance.

Referring to FIGS. 6A and 6B, a DAC 122 is shown in detail, which has utility in the system source and destination component 12a shown in FIG. 5. Elements of FIGS. 6A and 6B, which are common to FIG. 5, are identified by the same reference characters. The DAC 122 comprises an analog interface 124, a transmit/receive interlock 126 (designated "Tx/Rx INTERLOCK" in FIGS. 6A and 6B), black, pink and red en/de-cryptors 128a, 128b, 128c, respectively, and a transmit/receive multiplexer/demultiplexer 130 (designated "Tx MUX" in FIGS. 6A and 6B). The DAC 122 further comprises a PC interface 140, a T1 interface 141, a receive/transmit demultiplexer/multiplexer 142 (designated "Rx MUX" in FIGS. 6A and 6B), a parity generator/detector and receive mute 144 (designated "Tx/Rx PARITY Rx MUTE" in FIGS. 6A and 6B), and a codec 152. The codec 152 provides analog-to-digital and digital-to-analog conversion, thereby enabling analog voice signals to be transmitted over the digital T1 links or TDM bus in either the Tx or Rx direction.

The DAC 122 supports any number of analog internal input/output devices external to the DAC 122. In the present embodiment, the DAC 122 supports the headset 20a and headset PTT 20g (shown in FIGS. 5 and 6A), but it is understood that the DAC 122 can additionally or alternatively support other internal input/output devices, such as microphones, speakers, and the like. The DAC 122 cooperatively functions with the headset 20a, headset PTT 20g, and a user authority 154 (alternately termed a security level access switch and designated "ACCESS SWITCH" in FIGS. 6A and 6B), which are external to the DAC 122, to perform the desired function of generating internal data signals and compartmentalizing them at their respective security levels on common media. The security level access switch 154 may be a lock and key or some other manually or electronically secured switch used to select a Tx security level.

The desired DAC function is achieved inter alia by providing a separate hardware-based en/de-cryptor for each available security level of the system 10. In the present embodiment, there are three security levels available to the system 10, black, pink and red, which are supported by the DAC 122. However, the system 10 may alternately have more or less than three available security levels (but always at least two security levels). It is within the scope of the present invention to modify the DAC 122 in a manner within the purview of the skilled artisan so that the DAC supports alternate numbers of available security levels.

The DAC 122 supports the present three levels of security by means of the black en/de-cryptor 128a, the pink en/decryptor 128b, and the red en/de-cryptor 128c internal to the DAC 122. The mechanisms of the en/de-cryptors 128 are entirely hardware based to avoid trusted software. Each en/de-cryptor 128 is a 16-bit encryptor and a 16-bit decryptor, although it is within the scope of the present invention to implant the en/de-cryptor 128 more than 16 bits or fewer than 16 bits. Each en/de-cryptor 128 uses a different fixed polynomial and key, which corresponds to the given security level of the en/de-cryptor 128, to separately encode internal encryption on the input signals. Internal encryption is essentially a form of internal data scrambling. The input signals are only internally encrypted between system source and data destination components 12 so that the internal data signals and the internal encryption codes of the en/de-cryptors 128 never leave the confines of the system 10.

The internal encryption codes are simply a means for ensuring that internal data signals at different security levels do not cross compartment boundaries within the common data media of the system 10. Accordingly, the internal encryption is not subject to the stringent requirements of standard cryptographic equipment, which is designed to keep encrypted data secure when disclosed to or appropriated by unintended recipients external to the system. External data security is achieved by separate cryptographic devices such as external cryptos described above.

The en/de-cryptors 128 perform a number of specific functions related to encryption and decryption. For example, each en/de-cryptor 128 prevents resynchronizing more frequently than every 16,000 frames. Each en/de-cryptor 128 verifies that the internal encryption code is not all 0's. If all 0's are detected in the internal encryption code (i.e., 16 or more consecutive 0's), the en/de-cryptor from which the internal encryption code originates blocks all audio and informs the PC 118 (shown in FIG. 5), which interfaces with the DAC 122 via a PC interface 140. However, the PC 118 is otherwise unable to inhibit or interfere with the encrypting and decrypting functions.

A method for generating and segregating a red internal data signal at a transmitting system source and destination component 12a is described hereafter with continuing reference to FIGS. 1, 5, 6A and 6B for purposes of illustrating system operation. Operation of the system 10 is initiated by an operator speaking into the operator headset 20a while the operator depresses the headset PTT 20g and selects the red Tx security level setting for the security level access switch 154. The operator headset 20a forwards the voice audio to the analog interface 124 via the input/output connectors 112 external to the DAC 122 (shown in FIG. 5, but not shown in FIGS. 6A and 6B). The analog interface 124 transmits the corresponding input signal (mic Tx audio) to the codec 152 where the signal is digitized. The Rx mute 144 adds parity to the digitized signal (mic Tx digital) and the signal is directed to the proper security level in the hardware-based Tx/Rx interlock 126. The Tx/Rx interlock 126 routes the input signal to the red en/de-cryptor 128c based on a transmit red security level set by the operator on the security level access switch 154 and the state of the headset PTT 20g. The Tx/Rx interlock 126 also ensures that the input signal is not transmitted to an en/de-cryptor for a security level other than red, i.e., en/de-cryptor 128a or 128b. Thus, the Tx/Rx interlock 126 prevents simultaneous transmission of the same input signal to more than one en/de-cryptor 128.

The red en/de-cryptor 128d generates a red internal data signal upon receipt of the input signal. The resulting red internal data signal is transferred from the red en/de-cryptor 128c to the Tx mux 130. The Tx mux 130 places the red internal data signal on a data stream with other internal data signals at black, pink or red security levels generated by the black, pink and red en/de-cryptor's 128a, 128b, 128c, respectively, while segregating each internal data signal according to its level of security. It is noted that the security level selection of the Rx mux 142, Tx/Rx interlock 126 and Tx mux 130 operate under the direction of the security level access switch 154. The selected Tx security level used by the Tx/Rx interlock 126 is displayed to an operator by hardware means and the hardware allows no changes to the security level during PTT.

The Tx mux 130 transfers the internal data signals to a T1 interface 141 of the DAC 122, which places the internal data signals on a T1 link associated with the transmitting system source and destination component 12a in a compartmentalized manner by means of transformer coupling. The T1 link collectively moves the compartmentalized internal data signals including the present red internal data signal to the switching unit 14. Parity bits associated with each channel are placed onto special channels of the T1, as described above with reference to FIG. 4, are reassociated with their corresponding data before placement on the TDM bus 30.

All of the internal data signals on the T1 link are routed through a common receive T1 card at the switching unit 14 to a TDM bus internal to the switching unit 14. Every internal data signal including the internal red data signal on the TDM bus has at least one preassigned data destination, i.e., a preassigned receiving system source and destination component. (It is noted that an internal data signal can be broadcast to multiple destinations.) The internal red data signal along with all other internal data signals having the same preassigned receiving system and source destination component 12, regardless of security level, are routed through a common transmit T1 card onto a T1 link for the preassigned receiving system and source destination component 12.

The preassigned receiving system and source destination component structurally corresponds to the transmitting system and source destination component 12a, but is at a different location in the system 10. As such, the preassigned receiving system and source destination component includes a DAC, which is identical to the DAC 122 of the transmitting system and source destination component 12a. The DAC of the preassigned receiving system and source destination component is described hereafter with continuing reference to FIGS. 6A and 6B and is likewise designated by the reference character 122. The receiving DAC 122 employs the analog interface 124, the Tx/Rx interlock 126, the en/de-cryptors 128a, 128b, 128c and the Rx mux 142, which cooperatively function with a receiving headset 20a, headset PTT 20g, and security level access switch 154 associated with the receiving DAC 122 to perform the desired function of receiving internal data signals compartmentalized at their respective security levels on common media and separately decrypting the internal data signals in accordance with their security levels.

The red internal data signal is received and read by an operator at the preassigned receiving system and source destination component as a continuation of the above-recited method. In particular, the T1 interface 141 of the DAC 122 takes the internal data signals, including the red internal data signal, off of the T1 link associated with the preassigned receiving system and source destination component in a compartmentalized manner. The T1 interface 141 transfers the internal data signals to the Tx mux 130, which routes the internal data signals onto separate security paths in accordance with their security level. Thus, the Tx mux 130 routes the internal red internal data signal onto a separate red security path to the red en/de-cryptor 128c. The red en/de-cryptor 128c deciphers the red internal data signal upon receipt to produce an output signal which corresponds to the input signal at the transmitting system source and destination component. The resulting output signal is transmitted in series via the Tx/Rx interlock 126, Rx mux 142, Rx mute 144, and codec 152 to the analog interface 124. To hear (i.e., read) the voice audio, the operator listens on the receiving headset 20*a*, but without depressing the receiving headset PTT 20*g*.

The DAC 122 additionally includes structural and functional capabilities for detection of encryption or routing errors and remediation of the same. The Tx/Rx interlock 126 is designed to block receive and transmit internal data signals based on operational needs or when an error occurs. For example, the Tx/Rx interlock 126 blocks receive data signals, which are at a higher security level (e.g., pink and red) when transmitting on a lower Tx security level (e.g., black). The ability to access the red Tx security level is dependent on the setting of the security level access switch 154. As another example, all red internal data signals can be completely blocked to the user by the Tx/Rx interlock 126 when the security level access switch 154 is not enabled to access the red security level. The specific behavior of the Tx/Rx interlock 126 is dependent on operational needs and is tailored accordingly.

The Rx mute 144 ensures that an operator is not subjected to encrypted output signals at the operator headset 20*a*. The Rx mute 144 cuts off the receive audio to the operator headset 20*a* whenever an output signal is received from any of the en/de-cryptors 128 via the Tx/Rx interlock 126 and Rx mux 142, which remains encrypted or is not otherwise decrypted correctly. The mechanisms of the Tx/Rx interlock 126 and the Rx mute 144 are entirely hardware based to avoid issues with the use of trusted software. The mechanisms of the Tx/Rx interlock 126 and the Rx mute 144 also prevent security from being compromised in the event of one or more system faults as described below.

The DAC 122 has Tx/Rx parity associated with the Rx mute 144 for generating transmit error detection markers and for checking receive error detection markers in cooperation with the Tx mux 130 and Rx mux 142. As shown in FIG. 4, the Tx mux 130 multiplexes an encrypted parity bit for each channel into a bit of channels 21 through 23 at the data sources. The transmitted parity bit corresponds to the data for the same frame. In other words there is no delay with respect to data. The Tx mux 130 also distributes the parity bits received on T1 channels 21-23 to the en/de-cryptors 128 at the data destinations. The received parity bit corresponds to the data from the same frame, i.e., as above there is no delay with respect to data.

A parity generator check is effected as follows, wherein each B channel has one associated parity bit. The number of 1's in each 9-bit word including the parity bit is even. On transmission, parity is generated prior to being encrypted and is encrypted along with the associated 8 bits of audio data. On receive, parity is checked after decrypting. If parity is in error, the data is blocked by setting the receive data passed to the codec 152 to μ-law 0 (FF hex). The data is kept at the zero value for no less than 16 frames. Blocking of receive data discontinues when parity is correct for more than 16 consecutive frames. The blocking status of each channel is independent. The parity checker reports all parity errors to the PC 118.

A single parity bit is associated with each digital audio channel exchanged with the switching unit 14 to ensure that an operator is never subjected to internally encrypted audio on an operator headset or other analog output, which receives internally encrypted data from the switching unit 14. Use of a single parity bit for error detection is relatively weak, only being capable of identifying about 50% of the errors in the decrypted data. However, the Rx mute 144 of the DAC 122 immediately mutes the audio channel to the operator for a short period of time (e.g., 100 frames) whenever a parity error is detected. The audio channel is not restored until the parity bit is consecutively correct for several frames. Accordingly, the probability of encrypted audio reaching the operator is very low. It is virtually assured that improperly internally encrypted audio will be muted by the Rx mute 144 should the process control software make a connection error and route the audio to an incorrect security level or should any of the en/de-cryptors 128 be out of sync.

Figure 7:
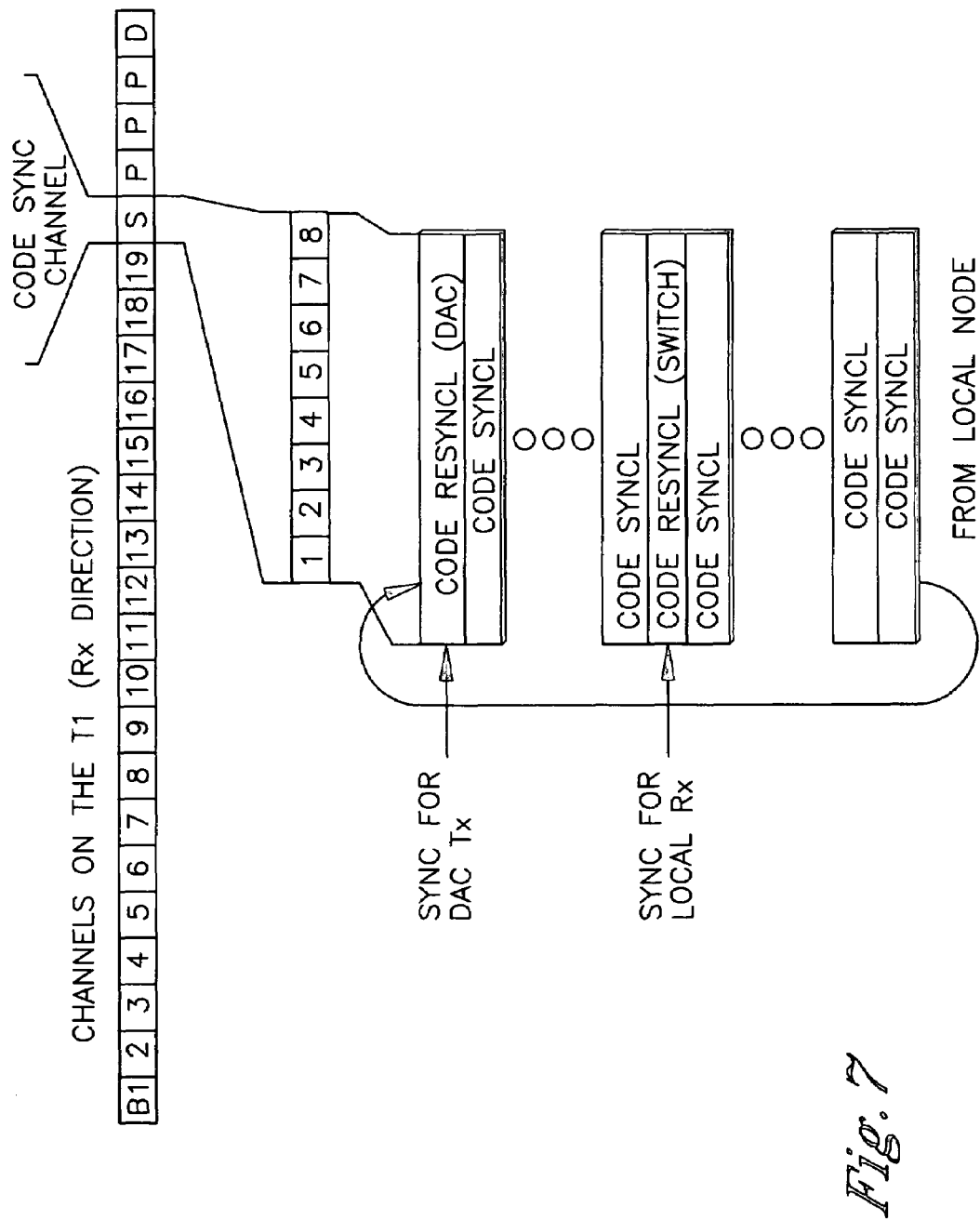
FIG. 7 is a schematic diagram of the synchronization signals processed by the digital audio card of FIGS. 6A and 6B in accordance with a method of the present invention.

The Tx mux 130 also receives and processes two periodic synchronization signals from the switching unit 14. Referring to FIG. 7, the synchronization signals are on channel 20 of a T1 data stream which is traveling in the Rx direction. The Tx mux 130 provides an indication to the en/de-cryptors 128 and to the PC indicating the state of the code sync. The state indicates that the synchronization signal has been lost if more than 1 out of 100 sync words is received in error. On frames where the Tx mux 130 receives a code resync (designated "CODE RESYNCL DAC" in FIG. 7), the Tx mux 130 provides an indication to the en/de-cryptors 128 so that the en/de-cryptors 128 can resynchronize to the digital switch. The resync causes an LSFR 156 in the en/decryptors to reset to a known starting point, which is described below as loading a new key. The Tx mux 130 also provides an indication to the PC 118 (shown in FIG. 5) when the Tx mux 130 receives a code resync so that the PC 118 knows the status of the code sync.

Figure 8:
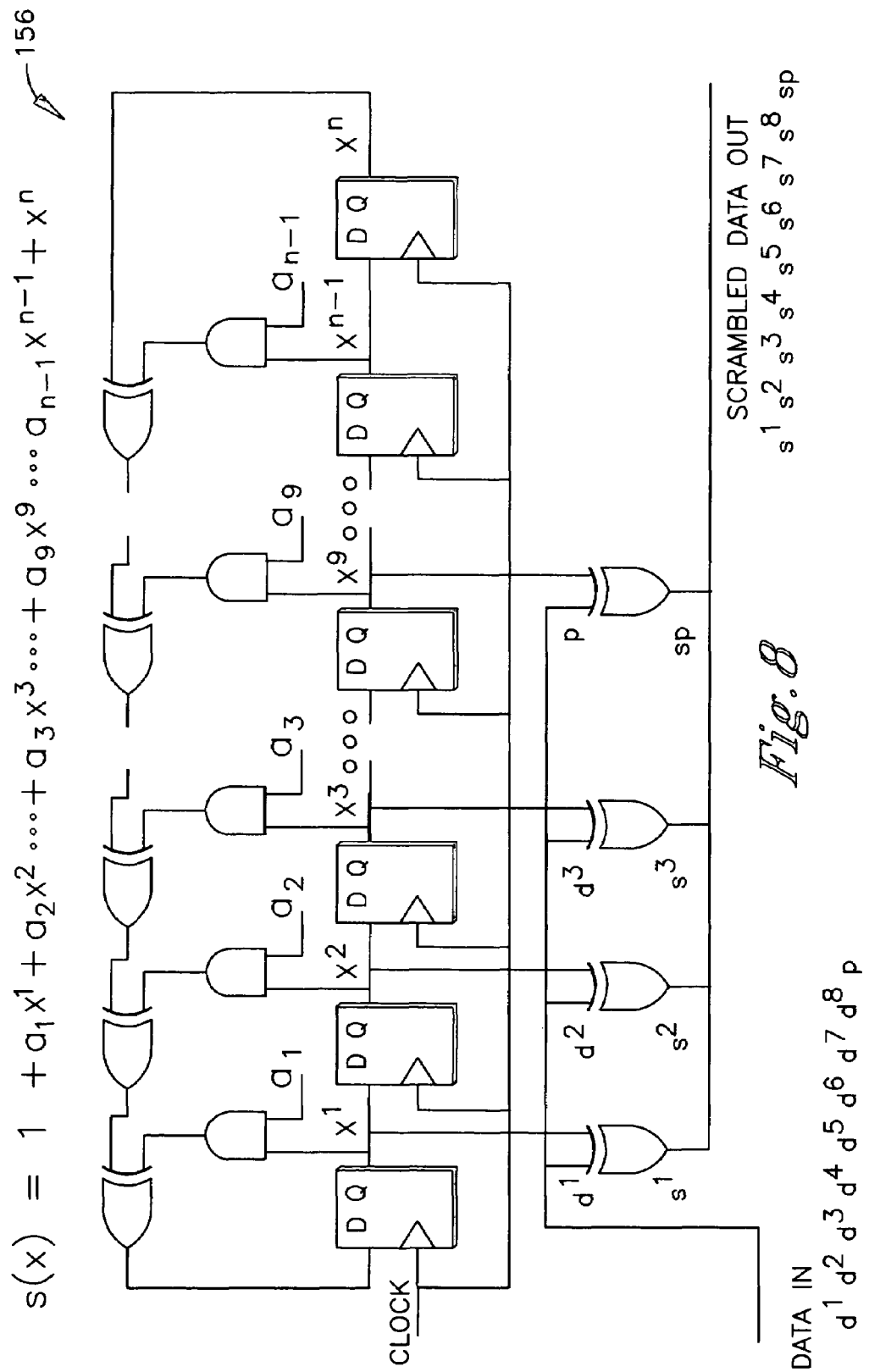
FIG. 8 is a schematic block diagram of a linear feedback shift register having utility with the digital audio card of FIGS. 6A and 6B.

Each DAC 122 cooperatively functions with a linear feedback shift register (LFSR) 156 as shown in FIG. 8. The en/de-cryptor for each security level uses a different maximum length LFSR polynomial s(x). For each 9 bits of data (8-bit digital audio channel and its associated 1 bit of parity), the en/de-cryptor exclusive or's (XORs) the 9 data bits with 9 data bits from the LFSR. The LFSR used by the en/de-cryptor or record encryptor is advanced 9 bits between every frame. On frames where resynchronization occurs, the LFSR is advanced after the new key is loaded. The LFSRs are synchronized so that encrypted audio arrives on the TDM bus backplane at the same time as if it were sourced from a card in the switching unit 14.

On receive, each DAC 122 is capable of decrypting internal data signals at each security level. The DAC 122 accommodates a delay between the DAC Tx code synchronization and the Rx local code synchronization of 6 to 18 frame times. This is sufficient to accommodate the worst case round trip delay from the DAC 122 to the TDM bus and back to the DAC 122. To synchronize the LFSR, the DAC 122 loads a fixed non-zero key into the LFSR. At the end of the frame in which a receive synchronization is received, the DAC 122 loads the key into the LFSR corresponding to the type of receive synchronization is received (i.e., DAC Tx or Switch Rx). The purpose of synchronization is to make data sourced at a system source and destination component 12 appear as if it was generated at the switching unit 14.

Upon receipt of a code sync from the switching unit 14, the en/de-cryptor synchronizes all versions of the LFSR (Tx, local Rx and remote Rx) at the appropriate time. Synchronization does not interfere with the Tx or Rx data if the LFSR is currently synchronized with the switching unit 14. In other words, synchronization causes the key to be reloaded on the fly with no observable effects. Synchronization occurs independently for each security level.

The DAC 122 is described above as having utility in the system source and destination component 12 of FIG. 5. It is apparent to the skilled artisan that the circuitry and features of the DAC 122 likewise have utility in the switching unit 14 of FIG. 1. In particular, circuit cards are provided in the switching unit 14 to receive externally-originating input signals from the external input/output devices of the system 10, namely the external radio and external crypto, and/or to transmit output signals to the external input/output devices of the system 10. The external interfaces in the switching unit 14 operate in substantially the same manner as the DACs 122 in the internal system source and destination components 12. For example, the headset interface of FIGS. 6A and 6B becomes the Tx and Rx audio signals to the external radio or external crypto. In this case, the Rx mute of the DAC 122 additionally functions to ensure that incorrectly routed audio does not leave the system 10 through an external port in the switching unit 14.

While the forgoing preferred embodiments of the invention have been described and shown, it is understood that alternatives and modifications, such as those suggested and others, may be made thereto and fall within the scope of the invention.

I claim:

1. A confined communication system for internally communicating a plurality of data signals having different levels of security, said communication system comprising:
   a data source positioned within a high-trust confined space including;
      a low security encryptor for converting low security input signals to low security internal data signals having low security internal encryption;
      a high security encryptor for converting high security input signals to high security internal data signals having high security internal encryption; and
   a data destination positioned within said high-trust confined space including;
      a low security decryptor for converting said low security internal data signals to low security output signals;
      a high security decryptor for converting said high security internal data signals to high security output signals; and
   a switching unit positioned within said high-trust confined space for receiving said low and high security internal data signals and directing said low security internal data signals or said high security internal data signals or said low and high security internal data signals to said data destination, wherein said low and high security internal data signals are continuously retained in said high-trust confined space and said switching unit and said data destination use said low security internal encryption and high security internal encryption to segregate and compartmentalize said low security internal data signals from said high security internal data signals.

2. The communication system of claim 1 wherein said low and high security encryptors are hardware based.

3. The communication system of claim 1 wherein said low and high security decryptors are hardware based.

4. The communication system of claim 1 wherein said data source is in a system source and destination component.

5. The communication system of claim 1 wherein said data source is a digital audio card.

6. The communication system of claim 1 wherein said data source is a digital audio card linked to an external radio.

7. The communication system of claim 1 wherein said data source is a digital audio card linked to an external crypto.

8. The communication system of claim 1 wherein said data destination is in a system source and destination component.

9. The communication system of claim 1 wherein said data destination is a digital audio card in a system source and destination component.

10. The communication system of claim 1 wherein said data destination is a digital audio card linked to an external radio.

11. The communication system of claim 1 wherein said data destination is a digital audio card linked to an external crypto.

12. The communication system of claim 1 wherein said low and high security input signals are audio signals.

13. The communication system of claim 1 wherein said low and high security output signals are audio signals.

14. The communication system of claim 1 wherein said data source further includes an error detection marker generator for generating error detection markers to accompany said low and high security internal data signals.

15. The communication system of claim 1 wherein said data destination further includes an error detector for checking error detection markers accompanying said low and high security internal data signals.

16. A confined communication system for internally communicating a plurality of data signals having different levels of security, said communication system comprising:
   a first data source positioned within a high-trust confined space including;
      a first low security encryptor for converting first low security input signals to first low security internal data signals having a low security internal encryption;
      a first high security encryptor for converting first high security input signals to first high security internal data signals having a high security internal encryption; and
      a first source multiplexer for placing said first low security internal data signals and said first high security internal data signals on a first source data stream;
   a second data source positioned within said high-trust confined space including;
      a second low security encryptor for converting second low security input signals to second low security internal data signals having said low security internal encryption;
      a second high security encryptor for converting second high security input signals to second high security internal data signals having said high security internal encryption; and
      a second source multiplexer for placing said second low security internal data signals and said second high security internal data signals on a second source data stream;
   a first data destination positioned within said high-trust confined space including;
      a first low security decryptor for converting said first or second low security internal data signals to first low security output signals;
      a first high security decryptor for converting said first or second high security internal data signals to first high security output signals; and
      a first destination multiplexer for receiving a first destination data stream including said first low or high security internal data signals or said second low or high security internal data signals or a combination of said first or second low or high security internal data signals, separating said first and second low security internal data signals, if present on said first destination data stream, from said first and second high security internal data signals, if present on said first destination data stream, directing said first and second low security internal data signals, if present on said first destination data stream, to said first low security decryptor, and directing said first and second high security internal data signals, if present on said first destination data stream, to said first high security decryptor;

a switching unit positioned within said high-trust confined space for receiving said first low and high security internal data signals on said first source data stream from said first data source and said second low and high security internal data signals on said second source data stream from said second data source, placing said first low or high security internal data signals or said second low or high security internal data signals or a combination of said first or second low or high security internal data signals on said first destination data stream and directing said first destination data stream to said first data destination;

a first source common data medium positioned within said high-trust confined space linking said first data source and said switching unit for transferring said first source data stream from said first data source to said switching unit while maintaining said first low security internal data signals segregated from said first high security internal data signals by means of said low and high security internal encryption;

a second source common data medium positioned within said high-trust confined space linking said second data source and said switching unit for transferring said second source data stream from said second data source to said switching unit while maintaining said second low security internal data signals segregated from said second high security internal data signals by means of said low and high security internal encryption; and a first destination common data medium positioned within said high-trust confined space linking said switching unit and said first data destination for transferring said first destination data stream from said switching unit to said first data destination while maintaining said first or second low security internal data signals, if present on said first destination data stream, segregated from said first or second high security internal data signals, if present on said first destination data stream by means of said low and high security internal encryption, wherein said first and second source and destination data streams are continuously retained in said high-trust confined space.

17. The communication system of claim 16 further comprising:

a second data destination positioned within said high-trust confined space including;

a second low security decryptor for converting said first or second low security internal data signals to second low security output signals;

a second high security decryptor for converting said first or second high security internal data signals to second high security output signals; and a second destination multiplexer for receiving a second destination data stream including said first low or high security internal data signals or said second low or high security internal data signals or a combination of said first or second low or high security internal data signals, separating said first and second low security internal data signals, if present on said second destination data stream, from said first and second high security internal data signals, if present on said second destination data stream, directing said first and second low security internal data signals, if present on said second destination data stream, to said second low security decryptor, and directing said first and second high security internal data signals, if present on said second destination data stream, to said second high security decryptor;

wherein said switching unit is further for placing said first low or high security internal data signals or said second low or high security internal data signals or a combination of said first or second low or high security internal data signals on said second destination data stream and directing said second destination data stream to said first second destination; and a second destination common data medium linking said switching unit and said second data destination for transferring said second destination data stream from said switching unit to said second data destination while maintaining said first or second low security internal data signals, if present on said second destination data stream, segregated from said first or second high security internal data signals, if present on said second destination data stream by means of said low and high security internal encryption.

18. The communication system of claim 16 wherein said first and second low and high security encryptors are hardware based.

19. The communication system of claim 17 wherein said first and second low and high security decryptors are hardware based.

20. The communication system of claim 16 wherein said first data source further includes a first error detection marker generator for generating error detection markers to accompany said first low and high security internal data signals and said second data source further includes a second error detection marker generator for generating error detection markers to accompany said second low and high security internal data signals.

21. The communication system of claim 17 wherein said first data destination further includes a first error detector for checking error detection markers accompanying said first or second low or high security internal data signals, if present on said second destination data stream, and said second data destination further includes a second error detector for checking error detection markers accompanying said first or second low or high security internal data signals, if present on said second destination data stream.

22. A confined communication system for internally communicating a plurality of data signals having different levels of security, said communication system comprising:

means positioned within a high-trust confined space for converting low security input signals to low security internal data signals having low security internal encryption;

means positioned within said high-trust confined space for converting high security input signals to high security internal data signals having high security internal encryption;

means positioned within said high-trust confined space for converting said low security internal data signals to low security output signals;

means positioned within said high-trust confined space for converting said high security internal data signals to high security output signals;

means positioned within said high-trust confined space for transferring said high security internal data signals to said means for converting said high security internal data signals to high security output signals; and means positioned within said high-trust confined space for transferring said low security internal data signals to said means for converting said low security internal data signals to low security output signals, wherein said low and high security internal data signals are continuously retained in said high-trust confined space and said means for converting said low and high security internal data signals to low and high security output signals and said means for transferring said low and high security internal data signals use said low security internal encryption and high security internal encryption to segregate and compartmentalize said low security internal data signals from said high security internal data signals.

23. A confined communication system for internally communicating a plurality of data signals having different levels of security, said communication system comprising:
   means positioned within a high-trust confined space for converting low security input signals to low security internal data signals having low security internal encryption;
   means positioned within said high-trust confined space for converting high security input signals to high security internal data signals having high security internal encryption;
   means positioned within said high-trust confined space for placing said low security internal data signals and said high security internal data signals on a source data stream;
   means positioned within said high-trust confined space for converting said low security internal data signals to low security output signals;
   means positioned within said high-trust confined space for converting said high security internal data signals to high security output signals;
   means positioned within said high-trust confined space for receiving a destination data stream including said low security internal data signals or said high security internal data signals or said low and high security internal data signals, separating said low security internal data signals, if present on said destination data stream, from said high security internal data signals, if present on said destination data stream, directing said low security internal data signals, if present on said destination data stream, to said low security conversion means, and directing said high security internal data signals, if present on said destination data stream, to said high security conversion means using said low and high security internal encryption to segregate said low security internal data signals from said high security internal data signals;
   means positioned within said high-trust confined space for receiving said low and high security internal data signals on said source data stream from said source data stream placing means, placing said low security internal data signals or said high security internal data signals or said low and high security internal data signals on said destination data stream and directing said destination data stream to said destination data stream receiving means using said low and high security internal encryption to segregate said low security internal data signals from said high security internal data signals;
   means positioned within said high-trust confined space for transferring said source data stream from said source data stream placing means to said source data stream receiving means while maintaining said low security internal data signals segregated from said high security internal data signals by means of said low and high security internal encryption; and
   means positioned within said high-trust confined space for transferring said destination data stream from said source data stream receiving means to said destination data stream receiving means while maintaining said low security internal data signals, if present on said destination data stream, segregated from said high security internal data signals, if present on said destination data stream by means of said low and high security internal encryption, wherein said source and destination data streams are continuously retained in said high-trust confined space.

24. The communication system of claim 23 further comprising means for generating error detection markers to accompany said low and high security internal data signals.

25. The communication system of claim 23 further comprising means for checking error detection markers accompanying said low and high security internal data signals.

26. A method for internally communicating a plurality of data signals having different levels of security within a confined communication system comprising the steps of:
   converting low security input signals to low security internal data signals having low security internal encryption at a source location positioned within a high-trust confined space;
   converting high security input signals to high security internal data signals having high security internal encryption at a source location positioned within said high-trust confined space;
   transferring said high security internal data signals and low security internal data signals to a switching location while maintaining said low and security internal data signals within said high-trust confined space and maintaining said low security internal data signals segregated from said high security internal data signals by means of said low and high security internal encryption;
   directing said low security internal data signals or said high security internal data signals or said low and high security internal data signals to a destination location from said switching location while maintaining said low and security internal data signals within said high-trust confined space;
   transferring said low security internal data signals or said high security internal data signals or said low and high security internal data signals to said destination location while maintaining said low and security internal data signals within said high-trust confined space and maintaining said low security internal data signals, if present, segregated from said high security internal data signals, if present, by means of said low and high security internal encryption;
   separating said low security internal data signals, if present, from said high security internal data signals, if present, at said destination location using said low and high security internal encryption;
   converting said low security internal data signals, if present, to low security output signals at said destination location; and
   converting said high security internal data signals, if present, to high security output signals at said destination location.

27. A method for internally communicating a plurality of data signals having different levels of security within a confined communication system comprising the steps of:
   converting within a high-trust confined space low security input signals to low security internal data signals having low security internal encryption;
   converting within said high-trust confined space high security input signals to high security internal data signals having high security internal encryption;

placing said low security internal data signals and said high security internal data signals on a source data stream at a source location positioned within said high-trust confined space;

transferring said source data stream from said source location to a switching location positioned within said high-trust confined space while maintaining said source data stream within said high-trust confined space and maintaining said low security internal data signals segregated from said high security internal data signals by means of said low and high security internal encryption;

receiving within said high-trust confined space said low and high security internal data signals on said source data stream from said switching location;

placing within said high-trust confined space said low security internal data signals or said high security internal data signals or said low and high security internal data signals on a destination data stream;

transferring said destination data stream from said switching location to a destination location positioned within said high-trust confined space while maintaining said destination data stream within said high-trust confined space and maintaining said low security internal data signals, if present on said destination data stream, segregated from said high security internal data signals, if present on said destination data stream by means of said low and high security internal encryption;

receiving within said high-trust confined space said destination data stream including said low security internal data signals or said high security internal data signals or said low and high security internal data signals;

separating within said high-trust confined space said low security internal data signals, if present on said destination data stream, from said high security internal data signals, if present on said destination data stream using said low and high security internal encryption;

converting within said high-trust confined space said low security internal data signals, if present on said destination data stream, to low security output signals; and converting within said high-trust confined space said high security internal data signals, if present on said destination data stream, to high security output signals.

28. The method of claim 27 further comprising generating error detection markers to accompany said low and high security internal data signals.

29. The method of claim 27 further comprising checking error detection markers accompanying said low and high security internal data signals.

30. A confined communication system for internally switching a plurality of data signals having different levels of security, said communication system comprising:

a data source positioned within a high-trust confined space including;

a low security encryptor for converting low security input signals to low security internal data signals having a low security internal encryption;

a high security encryptor for converting high security input signals to high security internal data signals having a high security internal encryption; and a data destination positioned within said high-trust confined space including;

a low security decryptor for converting said low security internal data signals to low security output signals corresponding to said low security input signals by deciphering said low security internal encryption;

a high security decryptor for converting said high security internal data signals to high security output signals corresponding to said high security input signals by deciphering said high security internal encryption; and a switching medium positioned within said high-trust confined space for transferring said low and high security internal data signals from said data source to said data destination, wherein said low security internal data signals and high security internal data signals are continuously retained in said high-trust confined space and are maintained segregated on said switching medium by means of said low security internal encryption and said high security internal encryption, thereby preventing correct conversion of said low security internal data signals in said high security decryptor and correct conversion of said high security internal data signals in said low security decryptor.

31. The communication system of claim 30 wherein said low and high security encryptors are hardware based.

32. The communication system of claim 30 wherein said low and high security decryptors are hardware based.

33. The communication system of claim 30 further comprising means for generating error detection markers to accompany said low and high security internal data signals.

34. The communication system of claim 30 further comprising means for checking error detection markers accompanying said low and high security internal data signals.

35. The communication system of claim 34 further comprising means for blocking low or high security output signals from exiting said communication system when said checking means detects errors.

36. The communication system of claim 34, wherein said low or high security output signals are audio signals, said system further comprising means for muting said low or high security output signals when said checking means detects errors.

37. The communication system of claim 30 wherein said switching medium is a TDM bus.

38. The communication system of claim 1, wherein said high-trust confined space is an onboard aircraft or onboard ship environment.

39. The communication system of claim 16, wherein said high-trust confined space is an onboard aircraft or onboard ship environment.

40. The communication system of claim 22, wherein said high-trust confined space is an onboard aircraft or onboard ship environment.

41. The communication system of claim 23, wherein said high-trust confined space is an onboard aircraft or onboard ship environment.

42. The method of claim 26, wherein said high-trust confined space is an onboard aircraft or onboard ship environment.

43. The method of claim 27, wherein said high-trust confined space is an onboard aircraft or onboard ship environment.

44. The communication system of claim 30, wherein said high-trust confined space is an onboard aircraft or onboard ship environment.

* * * * *